United States Patent [19]
Bordignon

[11] Patent Number: 4,974,108
[45] Date of Patent: Nov. 27, 1990

[54] ELASTIC ELEMENT STRUCTURE FOR THE REEL RETENTION RATCHET GEAR IN MAGNETIC TAPE CASSETTES

[75] Inventor: Abramo Bordignon, Senago, Italy
[73] Assignee: A.T.B. S.p.A., Senago, Italy
[21] Appl. No.: 174,049
[22] Filed: Mar. 28, 1988
[30] Foreign Application Priority Data
Apr. 10, 1987 [IT] Italy ............... 20080 A/87
[51] Int. Cl.$^5$ ............................................. G11B 23/02
[52] U.S. Cl. ........................................ 360/132; 242/199
[58] Field of Search ................. 360/132; 242/198–201

[56] References Cited

U.S. PATENT DOCUMENTS

| | | | |
|---|---|---|---|
| 4,195,797 | 4/1980 | Okamura et al. | 242/199 |
| 4,553,717 | 11/1985 | Takagi | 360/132 X |
| 4,604,671 | 8/1986 | Oishi | 360/132 |
| 4,717,091 | 1/1988 | Schoettle | 360/132 X |
| 4,780,782 | 10/1988 | Bordignon | 360/132 |

FOREIGN PATENT DOCUMENTS 0052479 5/1982 European Pat. Off. .
2556433 7/1985 France .

*Primary Examiner*—A. J. Heinz
*Attorney, Agent, or Firm*—Guido Modiano; Albert Josif

[57] ABSTRACT

The present invention relates to an elastic element structure for the reel retention ratchet gear in magnetic tape cassettes which comprises an elastic lamina with elongated extension defining a central portion for coupling to a magnetic tape cassette and two opposite branches acting, at their free end, on the respective thrust arms of the reel retention ratchets. The peculiarity of the invention resides in the fact that it comprises, at said free ends, shapings adapted to generate a thrust component in the direction of elastic preloading of said elastic lamina upon the insertion of said ratchets in said cassette along a direction substantially coinciding with their axis of oscillation.

6 Claims, 2 Drawing Sheets

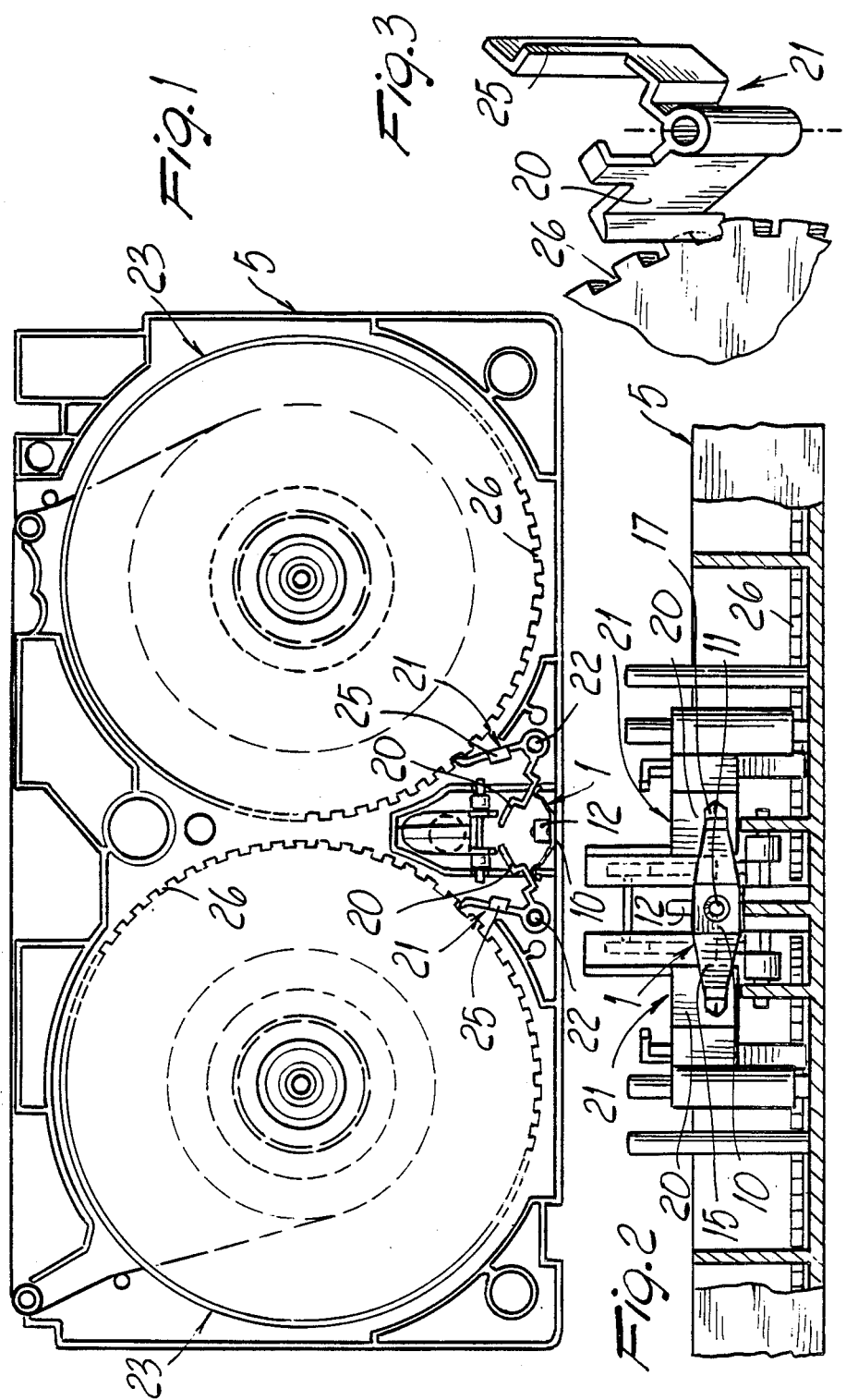

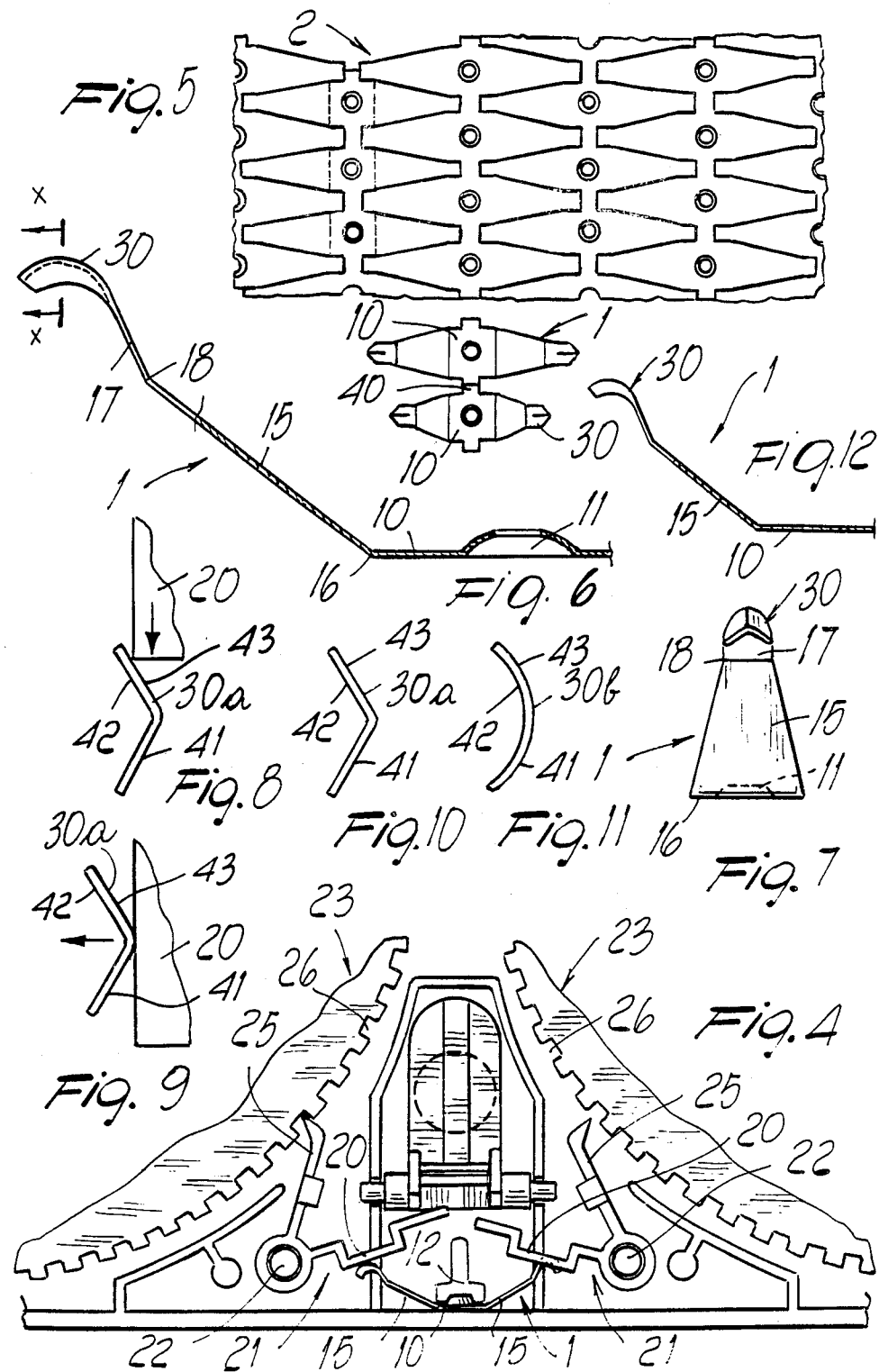

ELASTIC ELEMENT STRUCTURE FOR THE REEL RETENTION RATCHET GEAR IN MAGNETIC TAPE CASSETTES

BACKGROUND OF THE INVENTION

The present invention relates to an elastic element structure for the real retention ratchet gear in magnetic tape cassettes.

As is known, in magnetic tape cassettes, in particular in so-called videocassettes, a ratchet gear is used which is constituted by a pair of ratchets oscillating about an axis substantially parallel to the axis of rotation of the reels, which are pushed elastically against a toothed flange of the reel, so as to prevent the rotation of the reels, when the cassette is not inserted in the recording or playback device, to prevent the rotation of said reels in the direction of unwinding of the tape from the reel.

Various types of elastic elements are currently used which are constituted, for example, by an elastic leaf spring having a lower flap for coupling to the cassette shell, to the side whereof two elastic arms are provided which act with a thrusting action on the thrust branches of the ratchets.

This type of solution has, first of all, the disadvantage of not allowing packaging of the elastic laminae in reels, since the presence of the small plate arranged to the side of the elastic arms does not allow the possibility of unwinding in a tape-like manner the various elastic elements.

Another disadvantage resides in the fact that the elastic preloading to be imparted to the elastic arms which thrust the ratchets must be performed, during the step of assembly of the cassette, by performing a composite movement during the insertion of the ratchets in the cassette, which slows down all the steps of automatic assembly of the cassette components.

To obviate these disadvantages, springs for videocassette ratchet gears have already been introduced which are substantially constituted by an elongated elastic lamina which is provided with a central portion, associable with the cassette structure, from which there extend two elastic arms, inclined with respect to the central portion, which act with a thrusting action against the ratchets.

This solution allows to package the various elastic elements in a continuous tape, but is not conducive to advantages regarding the elastic preloading of the laminae, which still require a composite movement of insertion of the ratchets.

To try to limit this disadvantage, ratchets have been introduced which, in their lower part of the thrust arm which engages with the elastic lamination, are provided with a bevel in the shape of an inclined plane, so that the insertion of the ratchet along the direction of oscillation of the ratchet itself creates a component which elastically compresses the elastic lamina.

This solution, though valid from many points of view, has the disadvantage of possibly creating particles which come loose from the thrust arm and may remain free within the cassette with the possibility of damage of other component elements. The elastic laminae are in fact generally obtained by punching and have burr at their free edges which may scrape the plastic material which constitutes the ratchets, removing particles of plastic which, by coming loose and remaining within the cassette, may create a severe detriment to the good quality of the cassette.

SUMMARY OF THE INVENTION

The aim proposed by the invention is to eliminate the above described disadvantages by providing an elastic element structure for the real retention ratchet gear in magnetic tape cassettes, which allows to obtain the elastic preloading of the laminae which act on the ratchets, without having to resort to a composite movement of insertion of the ratchet and without running the risk of scraping or in any way abrading the surface of the ratchet, with consequent outward dispersion of plastic particles.

Within the above described aim, a particular object of the invention is to provide an elastic element structure which may be packaged in a tape-like manner, thus having the possibility of winding in a reel a large number of elastic elements.

Another object of the present invention is to provide an elastic element structure which is configured so as to eliminate practically completely all of the punching burr which normally occurs during the step of punching of the individual elastic laminae from a metallic tape or band.

A further object of the present invention is to provide an elastic element structure which, though being obtainable with a reduced use of material, is capable of giving the greatest assurances of reliability and safety in use.

Not least object of the present invention is to provide an elastic element structure which is easily manufacturable from elements and materials commonly available on the market and which furthermore is competitive from a merely economical point of view.

The above described aim, as well as the objects mentioned and others which will become apparent hereinafter, are achieved by an elastic element structure for the reel retention ratchet gear for the retention of the reels in magnetic tape cassettes, according to the invention, comprising an elastic lamina with elongated extension defining a central portion for coupling to a magnetic tape cassette and two opposite arms acting, at their free end, on the respective thrust arms of the reel retention ratchets, characterized in that it comprises, at said free ends, shapings adapted to generate a component of thrust in the direction of elastic preloading of said elastic lamina upon the insertion of said ratchets in said cassette along a direction substantially coinciding with their axis of oscillation.

BRIEF DESCRIPTION OF THE DRAWINGS

Further characteristics and advantages of the invention will become apparent from the description of a preferred but not exclusive embodiment of a structure of an elastic element structure for the real retention ratchet gear in magnetic tape cassettes and the like, illustrated only by way of non-limitative example in the accompanying drawings, wherein:

FIG. 1 is a schematic plan view of a magnetic tape cassette with the cover removed, highlighting the positioning of the elastic element according to the invention, inside the cassette;

FIG. 2 is a sectional view of the cassette, highlighting the detail of the elastic element acting on the ratchets;

FIG. 3 is a schematic perspective view of a ratchet;

FIG. 4 is a detail view of the ratchet gear of a cassette with a ratchet inserted and with the other ratchet in the process of being inserted;

FIG. 5 is a schematic view of the step of punching the individual elastic laminae starting from a metallic band;

FIG. 6 is a partial sectional view, in greatly enlarged scale, of the elastic element according to the invention, highlighting the central portion and one of the arms which act elastically on the ratchets;

FIG. 7 is an end view of the elastic element;

FIGS. 8 and 9 are schematic views in succession of the step of insertion of a ratchet with consequent elastic preloading of the lamina at the moment of the insertion of the ratchets on their oscillation pivot;

FIGS. 10 and 11 are views of two different embodiments of the free end portion of the elastic lamina taken along the line X—X of FIG. 6;

FIG. 12 is a view of an elastic lamina with smooth central portion.

DESCRIPTION OF THE PREFERRED EMBODIMENTS

With reference to the above described figures, the elastic element structure for the reel retention ratchet gear in magnetic tape cassettes comprises an elastic lamina which is generally indicated by the reference numeral 1, which substantially has a predominantly elongated extension. The elastic lamina 1 is obtained, as shown in FIG. 5, by punching from a metallic band or tape, generally indicated by the reference numeral 2, and is shaped, as will become apparent hereinafter, so as to have no particular punching burr.

The elastic lamina 1 has a central portion 10 in which insertion coupling means may be provided, constituted for example by an indentation or possibly a hole 11 with beading, which has the function of providing the element for insertion coupling to a corresponding support 12 which is defined by the cassette, generally indicated by the reference numeral 5.

From the central portion 10 there extend two opposite branches, both indicated at 15, which are connected to the portion 10 by means of a first folding line 16; the branches 15 are inclined with respect to the plane of arrangement of the portion 10 and connect, at the other end, to a terminal portion 17, possibly connected by means of a second folding line 18, so that the terminal end has a greater inclination with respect to the central portion 10.

The terminal portions 17 act by contact on the thrust arm 20 of ratchets, generally indicated by the reference numeral 21, which are rotatable about pivots 22 defined by the cassette and having an axis substantially parallel to the axis of rotation of the reels 23.

The ratchets 21 have an engagement arm 25 which couples with the set of teeth 26 defined by the lower flange of the cassette reel.

In a per se known manner, the thrust arms 25 have the function of locking the rotation of the reels, when these are not used, in the direction of unwinding of the magnetic tape, while they allow the winding, with a practically ratchet-like coupling between the end of the thrust arm and the set of teeth 26.

The peculiarity of the invention resides in the fact that the terminal portions 17 of the elastic lamina have a convexity, indicated at 30, on the face directed towards the ratchets 21.

Specifically, the convexity or shaping 30, at the terminal portion 17 of each of the opposite branches 15, is located remote from the central portion 10 of the elastic lamina 1, and is defined by a convex surface 41 extending transversely across the shaping 30 of the terminal portion 17, and a concave surface 42 defined on said shaping 30 opposite said convex surface 41.

This convexity is extremely important since it defines, on the edges of the elastic laminae defined by the transverse extension of the convex surface 41, guiding portions or guides 43 which, upon the insertion of the ratchets 21 with a movement along the direction coinciding with the axis of oscillation of said ratchets, generate a thrust component on the elastic lamina which in practice performs the elastic preloading of said lamina.

As schematically indicated in FIGS. 8 and 9, by introducing the ratchets with a substantially vertical motion the lower edge of the ratchets couples with the region proximate to the edge of the lamina which is arranged in practice with an inclined plane, and generates a thrust component on the lamina which elastically preloads the same.

This type of coupling furthermore prevents the possible burr which may be present on the edges on the terminal portions from scraping the plastic material which constitutes the ratchets, with the possibility that particles of plastic material may become loose and dispersed in the cassette.

For the sake of descriptive completeness, it should be furthermore added that the central portion 10, on the sides orthogonal to the sides from which the laminae extend, is provided with expansions 40 which allow in practice to package the various laminae in the manner of a tape which can be wound in reels; as the lamina is then gradually inserted, by means of an automatic machine, on the cassette, the individual lamina is punched in each instance, said expansions constituting an element which facilitates the grip for their insertion.

Another important aspect of the invention resides in the fact that the elastic lamina has a width which decreases starting from the central portion towards the free end, this occuring since the resisting section useful for the bending torque can decrease as one approaches the free end of said lamina where contact with the ratchet gears occurs.

This arrangement allows to obtain a significant saving in material, since it is possible to adopt a configuration, schematically indicated in FIG. 5, with a substantially rectangular central portion 10 from which there extend said arms with progressively decreasing width so as to obtain with a punching operation the execution of a plurality of laminae with no burr whatever, since the region which is provided between two mutually side-by-side arms in practice constitutes the useful region for the provision of an arm of another row of laminae.

To what has been described it should be furthermore added that said convexity may be obtained by means of an inverted-V configuration, as indicated in FIG. 10 by the numeral 30a, or possibly with a rounded configuration, indicated at 30b in FIG. 11.

In practical use, therefore, once the elastic lamina is positioned at the support 12 of the cassette it is sufficient to introduce the left and right ratchets 21 with a substantially vertical translatory motion, so that the lower edge of the thrust arm of the ratchet couples with the edge part of the convexity of the terminal portion, so that the successive step of intruduction of the ratchet causes, automatically, the elastic compression of the spring, that is, its preloading, without resorting, as can be observed in current methods, to composite insertion movements.

Another important aspect of the invention resides in the fact that the configuration adopted for the lamina allows its production in tapes wound in reels, and consequently more easily used on automatic machines, and furthermore allows to obtain the punching while minimizing burr.

The invention thus conceived is susceptible to numerous modifications and variations, all of which are within the scope of the inventive concept.

Furthermore, all the details may be replaced with other technically equivalent elements.

In practice, the materials employed, so long as compatible with the specific use, as well as the contingent shapes and dimensions, may be any according to the requirements.

I claim:

1. Elastic element structure for real retention ratchet gear in magnetic tape cassettes comprising;
   at least one elastic lamina,
   at least one central portion defined by said elastic lamina,
   at least two opposite branches defined by said elastic lamina and being rigidly associated with said central portion,
   at least one terminal portion defined by each of said opposite branches remote from said central portion, and
   at least one shaping defined on each said terminal portion, wherein said shaping comprises at least one convex surface extending at least transversely across said terminal portion, said elastic element structure further comprising at least two first folding lines and at least two second folding lines, said first folding lines being defined between said central portion and each of said opposite brancehs, said second folding lines being defined between each of said opposite branches and each said terminal portion, said opposite branches being inclined with respect to said central portion and defininng a first inclination, said terminal portions being inclined with respect to said central portion and with respect to said opposite branches and defining a second inclination, said second inclination being greater than said first inclination.

2. Elastic element structure according to claim 1, wherein said convex surface defines at least one substantially V-shaped configuration.

3. Elastic element structure for real retention ratchet gear in magnetic tape cassettes comprising;
   at least one elastic lamina,
   at least one central portion defined by said elastic lamina,
   at least two opposite branches defined by said elastic lamina and being rigidly associated with said central portion,
   at least one terminal portion defined by each of said opposite branches remote from said central portion, and
   at least one shaping defined on each said terminal portion, wherein said shaping comprises;
   at least one convex surface extending transversely across said terminal portion, and
   wherein said convex surface defines at least one guide, whereby cooperation of said guide with a reel retention ratchet gear causes pre-loading of said elastic lamina, said elastic element structure further comprising at least two first folding lines and at least two second floding lines, said first folding lines being defined between said central portion and each of said opposite branches, said second folding lines being defined between each of said opposite branches and each said terminal portion, said opposite branches being inclined with respect to said central portion and defining a first inclination, said terminal portions being inclined with respect to said central portion and with respect to said opposite branches and defining a second inclination, said second inclination being greater than said first inclination.

4. Elastic element structure according to claim 3, wherein said convex surface defines at least one substantially V-shaped configuration.

5. In combination, a magnetic tape cassette and at least one elastic element structure, said magnetic tape cassette comprising;
   at least one cassette,
   reels rotatably mounted within said cassette,
   reel retention ratchet gear located within said cassette and cooperating with said reels for preventing rotation of said reels when said cassette is not in use, and
   coupling means defined in said cassette, said elastic element structure comprising;
   at least one elastic lamina,
   at least one central portion defined by said elastic lamina, said central portion being coupled to said cassette by said coupling means,
   at least two opposite branches defined by said elastic lamina and being rigidly associated with said central portion,
   at least one terminal portion defined by each of said opposite branches remote from said central portion, and
   at least one shaping defined on each said terminal portion, each said shaping acting on said reel retention ratchet gear, wherein each said shaping comprises;
   at least one convex surface extending transversely across said terminal portion, and
   at least one guide defined by said convenx surface, wherein said guide is adapted for cooperation with said reel retention ratchet gear, and
wherein said elastic lamina is pre-loaded upon being coupled to said coupling means through said cooperation between said guide and said reel retention ratchet gear, said combination further comprising at least two first folding lines and at least two second folding lines, said first folding lines being defined between said central portion and each of said opposite branches, said second folding lines being defined between each of said opposite branches and each said terminal portion, said opposite branches being inclined with respect to said central portion and defining a first inclination, said terminal portions being inclined with respect to said central portion and with respect to said opposite branches and defining a second inclination, said second inclination being greater than said first inclination.

6. Combination according to claim 5, wherein said convex surface defines at least one substantially V-shaped configuration.

* * * * *